United States Patent [19]

Coutrot et al.

[11] Patent Number: 5,301,233
[45] Date of Patent: Apr. 5, 1994

[54] PROCESS FOR THE TRANSMISSION AND RECEPTION OF PERSONALIZED PROGRAMS

[75] Inventors: Francoise Coutrot, Cesson Sevigne; Pierre Fevrier, St. Sulpice la Foret, both of France

[73] Assignees: France Telecom Etablissement Autonome de Droit Public, Paris; Telediffusion, Montrouge, both of France

[21] Appl. No.: 929,829

[22] Filed: Aug. 14, 1992

[30] Foreign Application Priority Data

Aug. 19, 1991 [FR] France ................................. 91 10404

[51] Int. Cl.5 ............................................... H04K 1/00
[52] U.S. Cl. .......................................... 380/23; 380/20
[58] Field of Search ........................ 380/12, 20, 23, 25

[56] References Cited

U.S. PATENT DOCUMENTS

| | | | |
|---|---|---|---|
| 4,323,921 | 4/1982 | Guillou | 380/20 X |
| 4,797,919 | 1/1989 | Murray et al. | 380/10 |
| 4,833,710 | 5/1990 | Hirashima | 380/20 |
| 4,947,428 | 8/1990 | Guillou et al. | 380/20 |
| 4,991,208 | 2/1991 | Walker et al. | 380/20 |
| 5,208,856 | 5/1993 | Leduc et al. | 380/20 X |

FOREIGN PATENT DOCUMENTS 0277247 8/1988 European Pat. Off. .
0285520 10/1988 European Pat. Off. .
0427601 5/1991 European Pat. Off. .

OTHER PUBLICATIONS

Computers & Security, vol. 9, No. 6, pp. 539-546, Oct., 1990, L. Harn, et al., "A Cryptographic Key Generation Scheme for Multilevel Data Security".

VLSI and Computer Peripherals, pp. 4-159 to 4-163, May 8-12, 1989, M. Steinacker, "VLSI Cryptotechnology".

*Primary Examiner*—Tod R. Swann
*Attorney, Agent, or Firm*—Oblon, Spivak, McClelland, Maier & Neustadt

[57] ABSTRACT

A process for the transmission and reception of personalized programs. The program is constituted by personalized program elements containing an identification of the recipient or addressee, the access to each program element being reserved for a single recipient and is conditioned for the possession of an access title covering the access criteria to the service and the possession of an individual identification on the part of each recipient. The access title control message enables users of the service to calculate, on the basis of the single cryptogram of a root control word and the identification of the recipient, all the personalized control words which will enable each recipient and him alone to descramble the elements relating to him.

12 Claims, 6 Drawing Sheets

FORMAT OF MESSAGES GPD

MESSAGE HEADING

EXTENSION OF THE MESSAGE HEADING

EXTENDED ADDRESS FIELD

PROCESS FOR THE TRANSMISSION AND RECEPTION OF PERSONALIZED PROGRAMS

BACKGROUND OF THE INVENTION

1. Field of the Invention

The present invention relates to a process for the transmission and reception of personalized programs.

2. Discussion of the Background

The great increase in the number of transmission or broadcasting supports or carriers (satellites, cables, microwave) has led program operators to vastly increase offers of services for access control programs, which can be in the form of audiovisual, sound or data transmission programs.

The principle of access control to such services is based on the scrambling of a program on transmission and the descrambling of the message received under the control of an access title. The scrambling and descrambling systems are initialized by a data, which varies in a random manner and which is known as a control word. The informations describing the access criteria to the program and a protected form of the control word are included in control messages of the access titles and which accompany the scrambled program.

To have access to a scrambled program it is necessary for the conditional access device to be able to exploit one of the control messages of the access titles associated with the program. In the case of "personalized" services for which the program is constituted by a plurality of program elements (video sequences and/or sounds and/or data) addressed to the same number of different addressees or recipients, each program element must only be restored in uncoded form for the single recipient involved and the control messages for the access titles must make it possible to guarantee the protection of each of the program elements.

The present invention relates to a process for the transmission and reception of access title control messages enabling any recipient (but him alone) to receive the program elements sent to him within the scope of a personalized transmission service.

The applications of such a process are all personalized program transmission or broadcasting services multiplexed on the same support, e.g. vocal messaging, data transmission (telex, data downloading, fax, radio messaging such as operator or alpha paging), fixed or moving picture transmission (video transmission), etc.

Existing processes making it possible to protect access to a broadcast program consist of allocating to each program element an access title control message. This method is widely used in pay television services for which each program or program element relates to a large audience and therefore for which it is sufficient to associate one or more, typically three or four access control messages with the complete broadcast program. The information rate specific to the access control relative to a broadcast program is then very small (typically a few hundred bytes per second for controlling an information rate of several megabytes per second).

Each access title control message generally has four fields:

an identifier of the service key to be used, a field defining the access conditions to be satisfied to have the right to use such a service key, the cryptogram or cryptograms of one or both control words, a redundancy field, which can be usefully added in order that the security processor cannot be used outside the intended context.

When the security processor contains an appropriate access right, i.e. when it holds the service key indicated by the identifier and said key is provided with a status compatible with certain conditions indicated in the access criteria field, the security processor decrypts or deciphers the cryptogram or cryptograms for reconstituting the control word or words. The control word enables the terminal to descramble the program or program elements with which it is associated.

In the case of personalized broadcasting services, the extension of the preceding method, which would consist of associating the same number of access title control messages as there are program elements accessible in a distinct manner, would make it necessary to reduce in certain cases, the information resource by two, assuming that the content of the information to be transmitted is roughly the same size as the actual access title control message (case of radiomessaging displaying 40 characters). This considerable decrease in the remaining useful resource i.e. the information is contrary to the economic profitability sought for the broadcast service.

SUMMARY OF THE INVENTION

The object of the present invention is to obviate this disadvantage. To this end, the present invention provides a process in which the program is broken down into the same number of program elements as there are personalized sequences (video and/or sound and/or data), said elements being identified by an identification individual to its recipient or addressee and having a scrambled content based on a control word specific to each recipient or addressee, which guarantees the confidentiality of the program sequences.

With the broadcast program is associated an access title control message making it possible for all the security processors of authorized users to reconstitute, on the basis of the cryptogram of a general control word known as the root control word and the identification of each recipient, the specific control word which will enable the descrambling of the program elements identified by said same identification of the recipient.

Whilst guaranteeing a total confidentiality of each of the program elements, the invention makes it possible to broadcast only a single access title control message on the basis of which all the recipients of program sequences could calculate the personalized control word used for the upstream scrambling of the information relating to him.

Such a process makes it possible to return to information rates identical to those of pay television services, namely a few hundred bytes per second.

More specifically, the present invention relates to a process for the transmission and reception of programs with access control to said programs, wherein:

(A) on transmission:

the programs are scrambled by a control word and access control messages are formed which in particular contain access criteria and a cryptogram of the control word, (B) on reception:

a check is made to establish whether the access criteria are fulfilled, the control word used for scrambling is reconstituted and the received programs are descrambled, said program being characterized in that, for addressing personalized programs to different recipients identified by identifiers, (A) on transmission:

the control word used for scrambling the program intended for the particular recipient is obtained by personalization, with the aid of the identifier of said recipient, of a single control word called the root control word and which applies to all the recipients and only a single access control message is transmitted for all the recipients, said message more particularly containing a cryptogram of the root control word, (B) on reception:

each recipient, with the aid of his identifier and the access control message, reconstitutes, on the basis of the root control word, his own personalized control word, which enables him and him alone to descramble the program intended for him.

DESCRIPTION OF THE PREFERRED EMBODIMENTS

Figure 1:
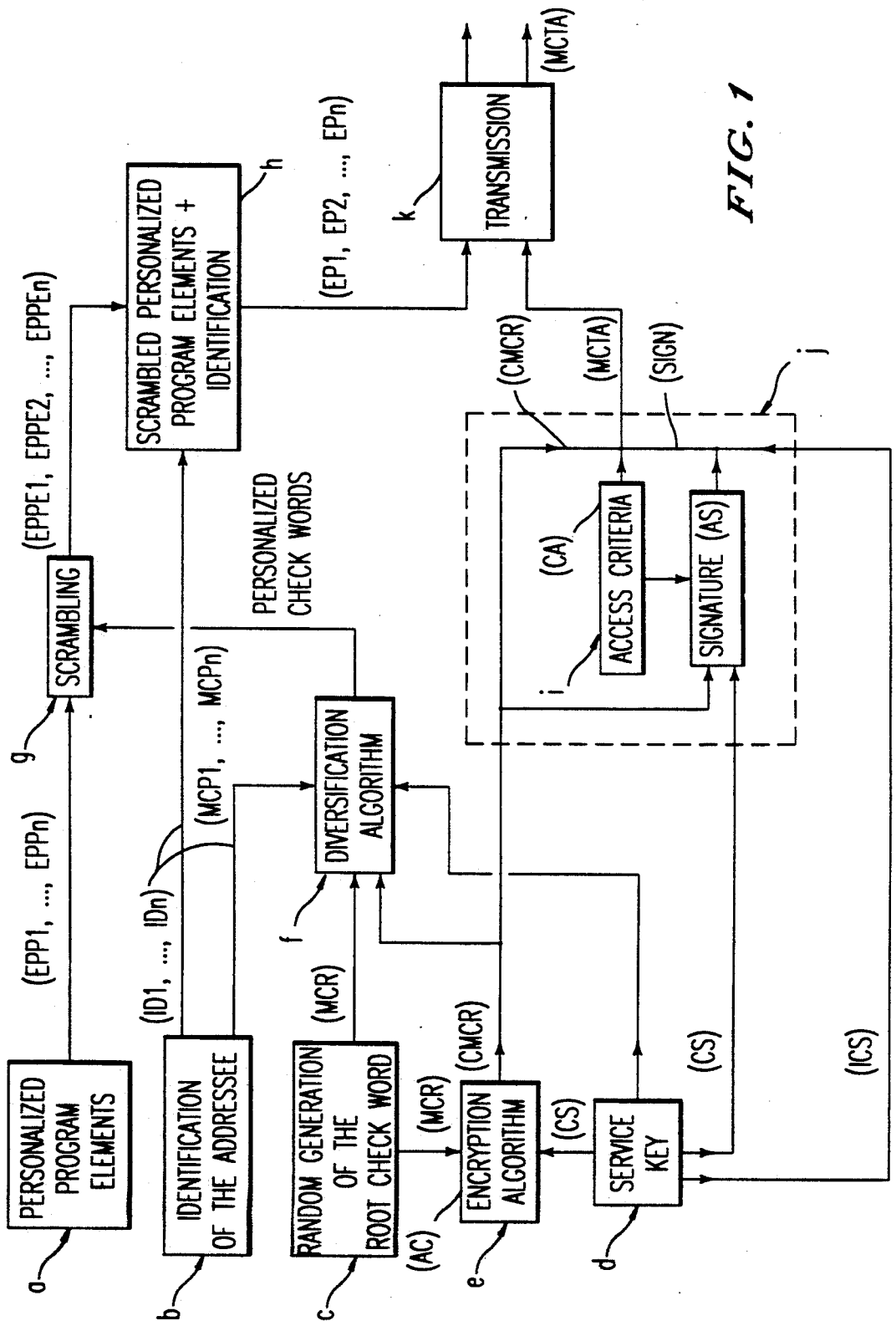
FIG. 1 shows in general form the various operations carried out on transmission.

In FIG. 1 and in other general drawings such as FIGS. 4,10,11,12, 13, etc., the different blocks shown correspond to various operations. It must not be considered that these operations are carried out by the same number of independent circuits. The expert knows that these operations are usually carried out on an overall basis by microprocessors, both on transmission and reception. FIG. 1 illustrates the essential operations performed on transmission.

The letter references (a, b, c, etc.) used in FIG. 1 correspond to the following paragraphs:

a) the program to be transmitted is subdivided into (n) program elements called "personalized program elements" (EPP1, EPP2, . . . EPPn) intended for (n) different addressees or recipients (D1, D2, . . . Dn);

b) to each recipient (D1, D2, . . . Dn) is allocated an identifier (ID1, ID2, . . . IDn);

c) in random manner a control word is produced, which applies to all the recipients and is called the "root control word" (MCR);

d) a service key (CS) is defined by a service key identifier (ICS);

e) on the basis of the root control word (MCR) and the service key (CS), an algorithm, known as the encrypting or ciphering algorithm (AC) is produced for obtaining a cryptogram of the root control word (CMCR);

f) on the basis of the root control word (MCR), the identification of the recipients, (ID1, ID2, . . . IDn) and the service key (CS), a so-called diversification algorithm (AD) is produced, which supplies control words individual to each recipient (D1, D2, . . . Dn) and which are known as "personalized control words" (MCP1, MCP2, . . . MCPn);

g) on the basis of personalized program elements (EPP1, EPP2, . . . , EPPn) and personalized control words (MCP1, MCP2, . . . , MCPn) corresponding to the different recipients (D1, D2, . . . , Dn) aimed at, said personalized program elements (EPP1, EPP2, . . . EPPn) are scrambled with the aid respectively of said personalized control words (MCP1, MCP2 . . . MCPn) in order to obtain scrambled personalized program elements (EPPE1, EPPE2, . . . EPPEn);

h) to said scrambled personalized program elements are added the identifiers of the recipients (ID1, ID2, . . . IDn) for constituting program elements (EP1, EP2, . . . EPn) individual to these different recipients;

i) the access criteria (CA) which must be satisfied in order to have the right to use the service key (CS) are defined;

j) on the basis of the identifier of the service key (ICS), the cryptogram of the root control word (CMCR), access criteria (CA) and optionally a signature of said cryptogram and the access criteria (SIGN) are formed access title control messages (MCTA);

k) the scrambled program elements (EP1, EP2, . . . EPn) and the access title control messages (MCTA) are transmitted.

Figure 2:
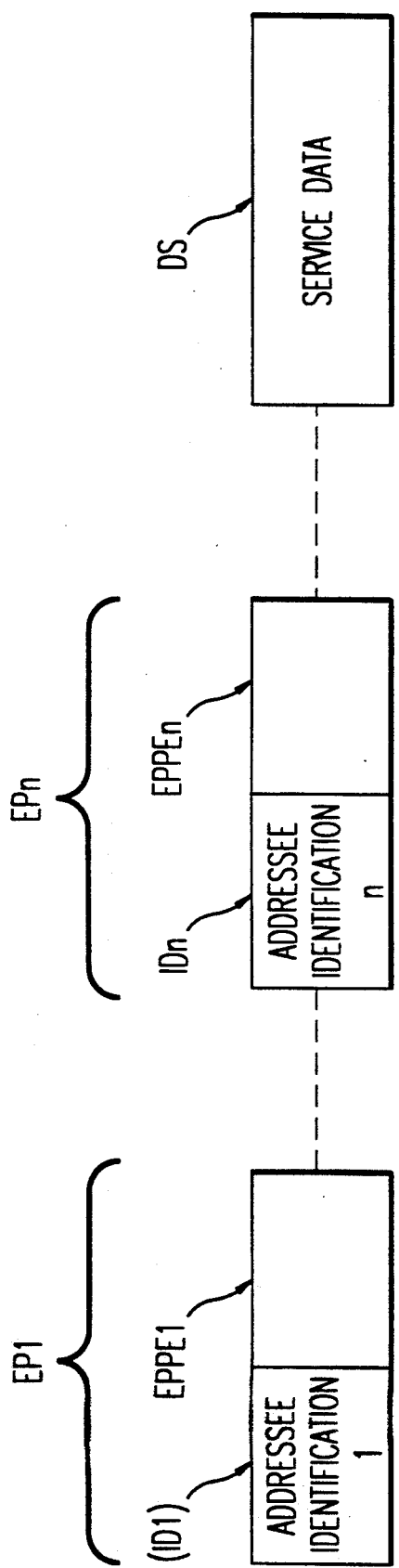
FIG. 2 illustrates the general structure of a broadcast program.

FIG. 2 shows the general structure of the program elements (EP1) . . . (EPn) with their recipient identifiers respectively (ID1), . . . (IDn) associated with the scrambled personalized program elements respectively (EPPE1), . . . (EPPEn). It is possible to add to said (n) blocks, a service data block (DS), which is not personalized (large audience broadcast service) or service data making it possible to describe the structure inherent in the service.

Figure 3:
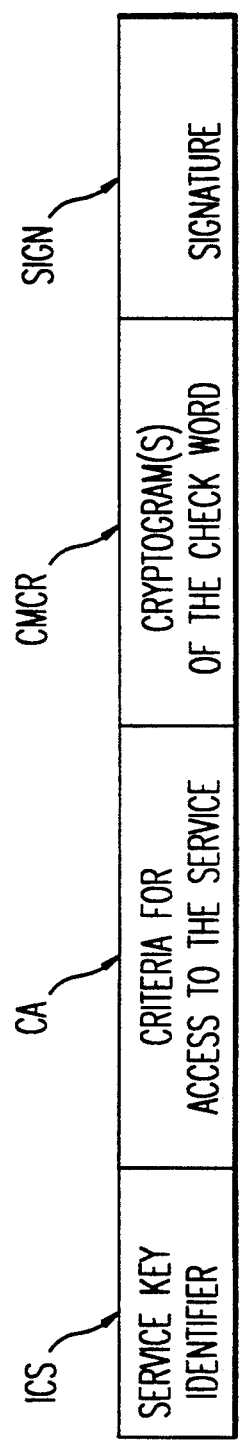
FIG. 3 illustrates the structure of an access title control message.

The access title control message (MCTA), which includes the access criteria to the program and information containing the cryptogram of the root control word (CMCR) can have a structure like that of FIG. 3, where it is possible to see a service key identifier (ICS) followed by access criteria to the service (CA), followed by the cryptogram of the root control word (CMCR) and finally and in optional manner the signature (SIGN) of the criteria of access and the root control word cryptogram.

Figure 4:
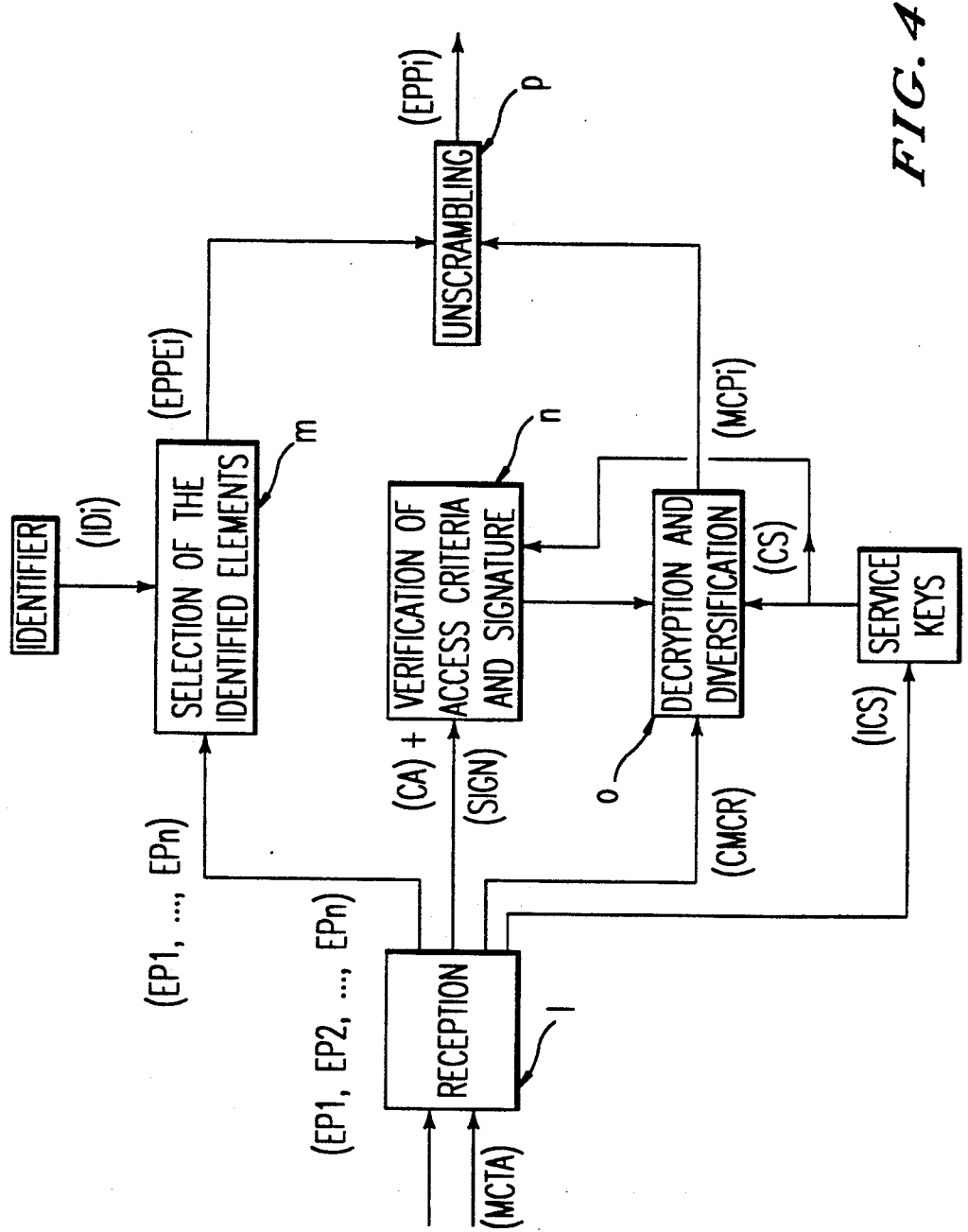
FIG. 4 shows in general form the various operations performed on reception by an access device.

The sequence of operations performed in the terminal of one of the recipients, e.g. the recipient of rank i (i being an integer between 1 and n) is diagrammatically shown in FIG. 4. These operations are defined in the following paragraphs, where the paragraph number again refers to the letter reference used for identifying the blocks in the drawing:

l) each recipient receives the scrambled program elements (EP1, EP2, ... EPn) with their recipient identifiers (ID1, ID2 ... IDn) and their scrambled personalized program elements (EPPE1, EPPE2, ... EPPEn) and also receives the access title control messages (MCTA);

m) the particular recipient (Di) retains, among the program elements which he receives, those which contain his identifier (IDi), which gives him the scrambled personalized program elements (EPPEi) intended for him;

n) this particular recipient (Di), on the basis of the access title control messages (MCTA), checks whether the access criteria (CA) are fulfilled by his access title and if so he checks the integrity of the message by analysis of the signature (SIGN) if this has been made on transmission;

o) on the basis of the cryptogram of the root control word (CMCR), the service key (CS) and his identifier (IDi), the recipient (Di) produces a reverse algorithm $(AC^{-1})$ of the encrypting algorithm (AC) produced on transmission in operation e) and also produces an algorithm (AD), which is the diversification algorithm (AD) produced on transmission in operation f) and he finally finds his individual personalized control word (MCPi);

p) the recipient (Di) then descrambles the scrambled personalized program elements (EPPEi) intended for him, obtained after operation m) on the basis of the personalized control word (MCPi), obtained after operation o) and obtains in uncoded form the personalized program elements (EPPi) intended for him.

An embodiment will now be described, which applies to signals of the MAC/packet-EUROCRYPT family (included in the full channel data broadcast method).

Figure 5:
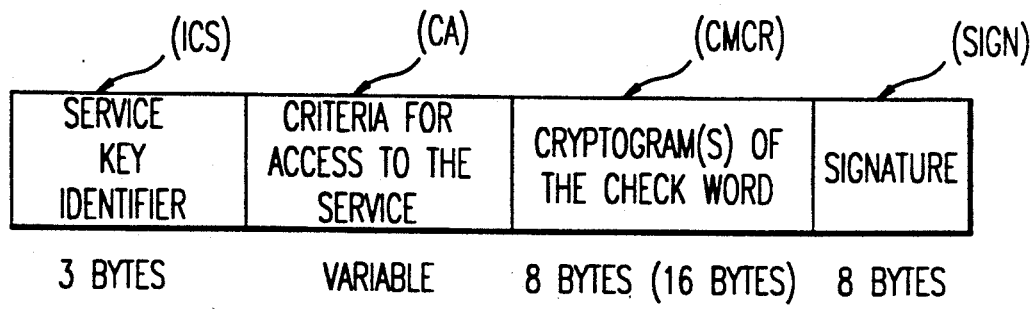
FIG. 5 shows the particular structure of an access title control message.

The structure of the access title control messages is as defined in the specification of the EUROCRYPT conditional access system applicable to signals of the MAC/packet family. It is illustrated in FIG. 5. The service key identifier (ICS) designates a secret key (CS) and extends to three bytes, the access criteria (CA) on a variable byte number, the cryptogram or cryptograms of the root control word (CMCR) obtained with the aid of the secret key (CS) extends over 8 or 16 bytes and the signature extends over 8 bytes. This signature is the result of a compression algorithm applied to the informations present in the access title control message (control word cryptogram(s) and access criteria) using the secret key (CS).

Figure 6:
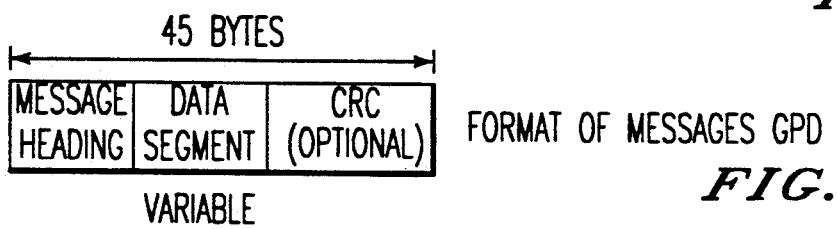
FIG. 6 illustrates the format of a message of the general purpose data protocol (GPD).

The formats of the messages corresponding to the broadcasting of digital data (teletext, sound, etc.) are described in part 4C of the specification document of a MAC/packet signal under the heading "General Purpose Data Protocol (GPD)". The structure of these messages is illustrated in FIG. 6, where the message comprises in all 45 bytes with a variable message header, a variable data segment and an error detection code field "Cyclic Redundancy Code" (CRC) in optional form.

Figure 7:
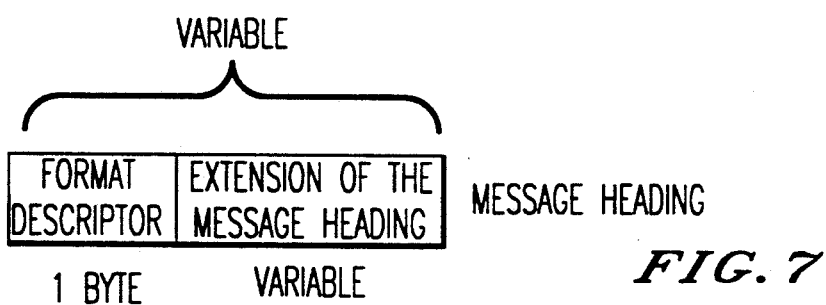
FIG. 7 illustrates the structure of a message heading.

The message heading is illustrated in FIG. 7 with a format directory or descriptor on one byte and a variable length message heading extension. The descriptor defines whether the message heading extension field is present, if the segment counter is present and if the address field is present.

Figure 8:
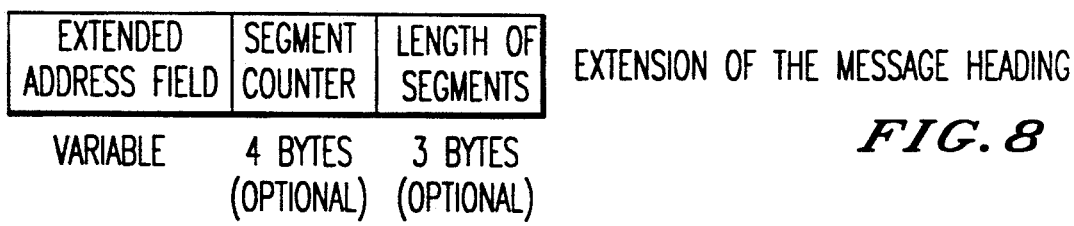
FIG. 8 illustrates the extension of a message heading.

FIG. 8 illustrates the extension of the message heading with a variable extended address field, an optional segment counter on four bytes and an optional segment length on three bytes.

Figure 9:
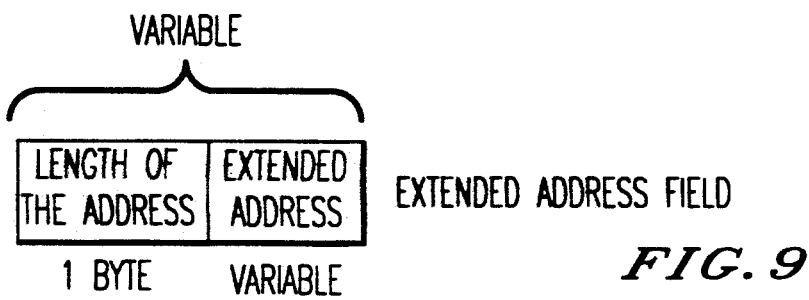
FIG. 9 illustrates an extended address field.

Finally, FIG. 9 illustrates the extended address field with an address length on one byte and a variable length extended address.

It is proposed to identify the GPD format messages by defining in the "extended address" field, the single five byte address (UA) such as described in the EUROCRYPT specification. This address defines in a unique manner each of the security processors of the users.

It should be noted that the identification process of the messages can also be integrated at the "applicative" level of the message, i.e. dependent on the nature of the informations exchanged within the data segments.

Figure 10:
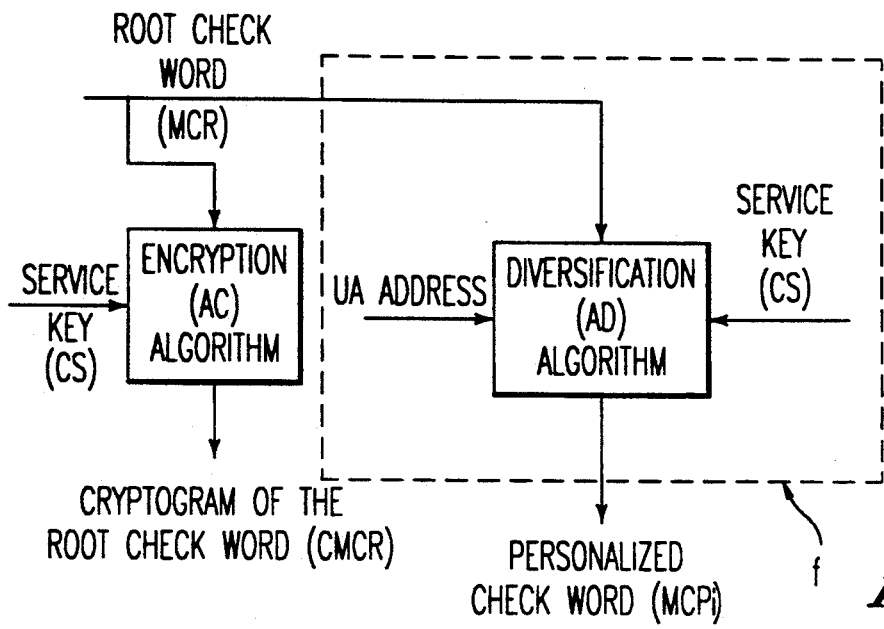
FIG. 10 shows a first variant of the means making it possible to obtain a personalized control word on transmission.
Figure 11:
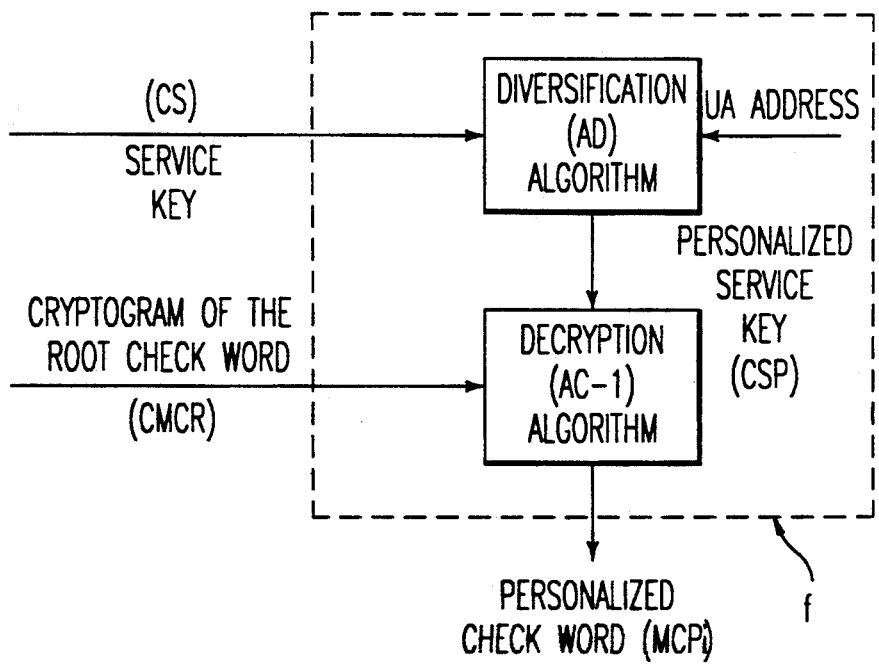
FIG. 11 shows a second variant of the means making it possible to obtain a personalized control word.

FIGS. 10 and 11 show two of the possible variants for obtaining a personalized control word on the basis either of the root control word, or the root control word cryptogram. These two variants are used on transmission. To them correspond two variants illustrated on reception and which will be described in conjunction with FIGS. 12 and 13.

In the variant illustrated in FIG. 10, to obtain in the aforementioned operation f) personalized control words (MCP1, MCP2, ..., MCPn) on the basis of the root control word (MCR) for identifying recipients defined by a single address (UA) and the service key (CS), the diversification algorithm (AD) is applied to the root control word with the single address (UA) of the recipient as the diversification parameter. To obtain the cryptogram of the root control word application takes place of the encrypting algorithm (AC) to the root control word (MCR) using the service key (CS) as the encrypting parameter.

In the variant of FIG. 11 the diversification algorithm (AD) is applied to the service key (CS) taking the single or unique address as the diversification parameter, which gives a personalized service key (CSP). This is followed by the application of the decrypting algorithm $(AC^{-1})$ to the cryptogram of the root control word (CMCR) taking the personalized service key (CSP) as the encrypting parameter.

Figure 12:
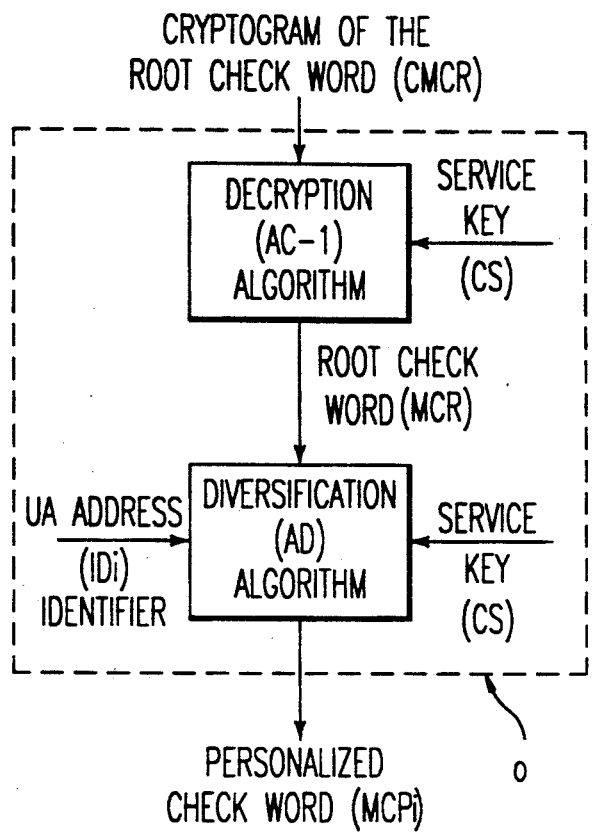
FIG. 12 illustrates a first variant of the means making it possible, on reception, to restore a personalized control word when the first variant has been used on transmission for obtaining said personalized control word.

On reception, in the case of the first variant illustrated in FIG. 12, to obtain on the basis of the root control word cryptogram (CMCR), the service key (CS) and the address (UA), the personalized control word (MCPi) individual to the recipient (Di), the first step is to apply to the cryptogram of the root control word (CMCR) the reverse decrypting algorithm $(AC^{-1})$ using the service key (CS) as the decrypting parameter, which gives the root control word (MCR), followed by the application to the latter of the reverse diversification algorithm (AD) using the single address (UA) as the diversification parameter, which finally gives the personalized control word (MCPi) individual thereto.

Figure 13:
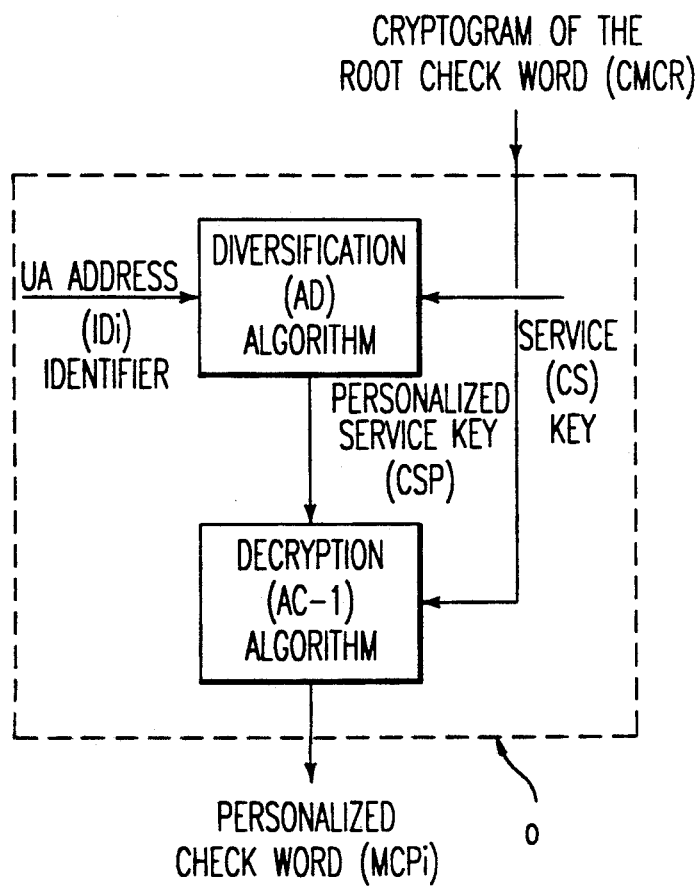
FIG. 13 shows a second variant of the means making it possible, on reception, to restore a personalized control word when the second variant has been used on transmission for obtaining said personalized control word.

In the second variant illustrated in FIG. 13, in order to obtain from the root control word cryptogram (CMCR), the service key (CS) and the single address (UA), the personalized control word individual to the recipient (Di), the first step is to apply the diversification algorithm (AD) to the service key (CS) with the address (UA) as the diversification parameter, which gives the personalized service key (CSP). This is followed by the application of the decrypting algorithm $(AC^{-1})$ to the root control word cryptogram (CMCR) taking the personalized service key (CSP) as the decrypting parameter, which finally gives the personalized control word (MCPi) individual to the recipient (Di).

In no matter which variant is involved, after obtaining the personalized control word, application takes place to a pseudo-random generator supplying the decrypting sequences corresponding to the encrypting sequences used on transmission.

The means for scrambling and descrambling the data segments can be conventionally constituted by exclusive-OR gates, whereof one input receives the encrypting/decrypting sequences and the other the uncoded/scrambled data and whose output supplies the scrambled/uncoded data.

In the practical embodiment, the processing performed by the conditional transmission/reception access device is integrally carried out by a security processor (smart card) for a rate equal to or below 2400 bauds (with existing smart card technologies). The processor supplies the encrypting/decrypting sequences to be applied to the data to be scrambled/descrambled. In the case of a higher rate, the pseudo-random generating function is transferred into the terminal and the processor supplies the personalized control words.

Although the present invention has been disclosed in combining the transmission process and the reception process, it should be understood that the invention covers the transmission process in se and the reception process in se.

We claim:

1. Process for the transmission and reception of programs with access control to said programs, wherein:
   (A) on transmission:
      the programs are scrambled by a control word and access control messages are formed which in particular contain access criteria and a cryptogram of the control word,
   (B) on reception:
      a check is made to establish whether the access criteria are fulfilled, the control word used for scrambling is reconstituted and the received programs are descrambled,
said process being characterized in that, for addressing personalized programs to different recipients identified by identifiers,
   (A) on transmission:
      the control word used for scrambling the program intended for the particular recipient is obtained by personalization, with the aid of the identifier of said recipient, of a single control word called the root control word and which applies to all the recipients and only a single access control message is transmitted for all the recipients, said message more particularly containing a cryptogram of the root control word,
   (B) on reception:
      each recipient, with the aid of the recipient's identifier and the access control message, reconstitutes, on the basis of the root control word, the recipient's own personalized control word, which enables only the intended recipient to descramble the program.

2. Process according to claim 1, characterized in that it comprises the following operations:
   (A) on transmission:
      a) the program to be transmitted is subdivided into several (n) program elements called personalized program elements (EPP1, EPP2, . . . EPPn) intended for the same number (n) of different recipients (D1,D2, . . . Dn);
      b) to each recipient (D1,D2, . . . Dn) is allocated an identifier (ID1, ID2, . . . IDn);
      c) in a random manner, a control word is produced which applies to each of the recipients and called the root control word (MCR);
      d) a service key (CS) is defined by a service key identifier (ICS);
      e) on the basis of the root control word (MCR) and the service key (CS) an encrypting algorithm (AC) is produced for obtaining a cryptogram of the root control word (CMCR);
      f) on the basis of the root control word (MCR) or the root control word cryptogram (CMCR), the identification of the recipients (ID1, ID2, . . . Idn) and the service key (CS) production takes place of a diversification algorithm (AD), which supplies individual control words for each recipient (D1,D2, . . . Dn), called personalized control words (MCP1, MCP2, . . . MCPn);
      g) on the basis of personalized program elements (EPP1,EPP2 . . . EPPn) and personalized control words (MCP1, MCP2, . . . MCPn) corresponding to the different recipients (D1,D2, . . . Dn) aimed at, a scrambling of said personalized program elements (EPP1,EPP2, . . . MPPn) is performed using respectively said personalized control words (MCP1, MCP2, . . . MCPn) to obtain scrambled personalized program elements (EPP1, EPP2, . . . EPPn);
      h) to these scrambled personalized program elements are added the recipient identifiers (ID1, ID2, . . . Idn) in order to form program elements (EP1, EP2, . . . EPn) individual to these different recipients;
      i) access criteria (CA) are defined and which must be satisfied to have the right of using the service key (CS);
      j) on the basis of the root control word cryptogram (CMCR), the service key identifier (ICS), access criteria (CA) and optionally a signature (SIGN) of said cryptogram and the access criteria, access title control messages (MCTA) are formed;
      k) the program elements (EP1, EP2, . . . Epn) and the access title control messages (MCTA) are transmitted;
   (B) on reception:
      l) each recipient receives the program elements (EP1,EP2, . . . Epn) with their recipient identifiers (ID1, ID2, . . . Idn) and their scrambled personalized program elements (EPPE1, EPPE2, . . . EPPn) and also receives the access title control messages (MCTA);
      m) a particular recipient (Di) retains the received program elements, which contain the identifier corresponding to the particular recipient (IDi), which gives the particular recipient the scrambled personalized program elements (EPPEi) intended for the particular recipient;
      n) on the basis of access title control messages (MCTA), the particular recipient (Di) checks whether the access criteria (CA) are fulfilled by the particular recipient's access title and if so, the particular recipient checks the integrity of the message by analyzing the signature if the latter has been made on transmission;

o) on the basis of the cryptogram of the root control word (CMCR), the service key (CS) and the identifier of the particular recipient, (IDi), the particular recipient (Di) produces the reverse algorithm ($AC^{-1}$) of the encrypting algorithm (AC) produced on transmission in operation e) and produces the diversification algorithm (AD) produced on transmission in operation f) for finding the particular recipient's own personalized control word (MCPi);

p) the particular recipient (Di) then descrambles the scrambled personalized program elements (EPPEi) intended for the particular recipient and obtained after operation m) on the basis of the personalized control word (MCPi) obtained after operation o) and obtains in uncoded form the personalized program elements (EPPi) individual to the particular recipient.

3. Process according to claim 2, characterized in that:

(A) on transmission:
in order to obtain, in operation f), personalized control words (MCP1, MCP2, ... MCPn) on the basis of the root control words (MCR), the identification of the recipients (ID1, ID2, ... IDn) and the service key (CS), the diversification algorithm (AD) is applied to the root control word with the service key (CS) and the single address (UA) of the recipient as the diversification parameter, (B) on reception:
to obtain, in operation o), from the cryptogram of the root control word (CMCR), the service key (CS) and the identifier (IDi), the personalized control word individual to the particular recipient (MCPi), the particular recipient (Di) starts by applying to the cryptogram the root control word (CMCR), the decrypting algorithm ($AC^{-1}$) which is the reverse of the encrypting algorithm (AC) using the service key (CS) as the parameter, which gives the particular recipient the root control word (MCR) and the particular recipient then applies to the latter the diversification algorithm (AD) using the single address (UA) as the diversification parameter, which finally gives the particular recipient the particular recipient's individual personalized control word (MCPi).

4. Processing according to claim 2, characterized in that:

(A) on transmission:
to obtain, in operation f), the personalized control words (MCP1, MCP2, ... MCPn) from the root control word (MCR), the recipient identifier (ID1, ID2, ... IDn) and the service key (CS), the diversification algorithm (AD) is applied to the service key (CS) taking the single or unique address as the diversification parameter, which gives a personalized service key (CSP) and then the decrypting algorithm ($AC^{-1}$) is applied to the root control word cryptogram (CMCR) using the personalized service key (CSP) as the decrypting parameter, (B) on reception:
to obtain, in operation o), from the root control word cryptogram (CMCR), the service key (CS) and the identifier (IDi), the personalized control word individual to the particular recipient (MCPi), the particular recipient (Di) applies the diversification algorithm (AD) to the service key (CS) with the address (UA) as the diversification parameter, which gives the particular recipient the personalized service key (CSP) and the particular recipient then applies the decrypting algorithm ($AC^{-1}$) to the root control word cryptogram (CMCR) taking the personalized service key (CSP) as the decrypting parameter, which finally gives the particular recipient the personalized control word (MCPi) individual to the particular recipient.

5. Process for the transmission of programs wherein the programs are scrambled by a control word and access control messages are formed which contain access criteria and a cryptogram of the control word, said process being characterized in that, for addressing personalized programs to different recipients identified by identifiers, the control word used for scrambling the program intended for a particular recipient is obtained by personalization, with the aid of the identifier of said recipient, of a single control word called the root control word and which applies to all the recipients and only a single access control message is transmitted for all the recipients, said message more particularly containing a cryptogram of the root control word.

6. Process according to claim 5, characterized in that it comprises the following operations:

a) the program to be transmitted is subdivided into several (n) program elements called personalized program elements (EPP1, EPP2, ... , EPPn) intended for the same number (n) of different recipients (D1, D2, ... , Dn);

b) to each recipient (D1, D2, ... , Dn) is allocated an identifier (ID1, ID2, ... , IDn);

c) in random manner a control word is produced which applies to all the recipients and called the root control word (MCR);

d) a service key (CS) is defined by a service key identifier (ICS);

e) on the basis of the root control word (MCR) and the service key (CS) an encrypting algorithm (AC) is produced for obtaining a cryptogram of the root control word (CMCR);

f) on the basis of the root control word (MCR) or the root control word cryptogram (CMCR), the identification of the recipients (ID1, ID2, ... , IDn) and the service key (CS) production takes place of a diversification algorithm (AD), which supplies individual control words for each recipient (D1, D2, ... , Dn) called personalized control words (MCP1, MCP2, ... , MCPn);

g) on the basis of personalized program elements (EPP1, EPP2, ... , EPPn) and personalized control words (MCP1, MCP2, ... , MCPn) corresponding to the different recipients (D1, D2, ... , Dn) aimed at, scrambling takes place of said personalized program elements (EPP1, EPP2, ... , EPPn) with the aid respectively of said personalized control words (MCP1, MCP2, ... , MCPn) to obtain scrambled personalized program elements (EPP1, EPP2, ... , EPPn);

h) to these scrambled personalized program elements are added the recipient identifiers (ID1, ID2, ... , IDn) in order to form program elements (EP1, EP2, ... , EPn) individual to these different recipients;

i) access criteria (CA) are defined and which must be satisfied to have the right of using the service key (CS);

j) on the basis of the root control word cryptogram (CMCR), the service key identifier (ICS), access criteria (CA) and optionally a signature (SIGN) of said cryptogram and the access criteria, access title control messages (MCTA) are formed;

k) the program elements (EP1, EP2, ..., EPn) and the access title control messages (MCTA) are transmitted.

7. Process according to claim 6, characterized in that in order to obtain, in operation f), personalized control words (MCP1, MCP2, ..., MCPn) on the basis of the root control words (MCR), the identification of the recipients (ID1, ID2, ..., IDn) and the service key (CS), the diversification algorithm (AD) is applied to the root control word with the service key (CS) and the single address (UA) of the recipient as the diversification parameter.

8. Process according to claim 6, characterized in that to obtain, in operation f), personalized control words (MCP1, MCP2, ..., MCPn) from root control word (MCR), the recipient identifier (ID1, ID2, ..., IDn) and the service key (CS), the diversification algorithm (AD) is applied to the service key (CS) taking the single or unique address as the diversification parameter, which gives a personalized service key (CSP) and then the decrypting algorithm ($AC^{-1}$) is applied to the root control word cryptogram (CMCR) using the personalized service key (CSP) as the decrypting parameter.

9. Process for the reception of programs transmitted according to the process of claim 5, wherein a check is made to establish whether the access criteria are fulfilled, the control word used for scrambling is reconstituted and the received programs are descrambled, said process being characterized in that each recipient, with the aid of the recipient's identifier and the access control message, reconstitutes, on the basis of the root control word, the recipient's own personalized control word, which enables only the intended recipient to descramble the program.

10. Process for the reception of programs transmitted according to the process of claim 6, wherein:

l) each recipient receives the program elements (EP1, EP2, ..., EPn) with their recipient identifiers (ID1, ID2, ..., IDn) and their scrambled personalized program elements (EPPE1, EPPE2, ..., EPPEn) and also receives the access title control messages (MCTA);

m) a particular recipient (Di) retains, in the received program elements, those which contain the identifier corresponding to the particular recipient (IDi), which gives the particular recipient the scrambled personalized program elements (EPPEi) intended for the particular recipient;

n) on the basis of access title control messages (MCTA), the particular recipient (Di) checks whether the access criteria (CA) are fulfilled by the particular recipient's access title and if so the particular recipient checks the integrity of the message by analyzing the signature if the latter has been made on transmission;

o) on the basis of the cryptogram of the root control word (CMCR), the service key (CS) and the particular recipient's identifier (IDi), the particular recipient (Di) produces the reverse algorithm ($AC^{-1}$) of the encrypting algorithm (AC) produced on transmission in operation e) and produces the diversification algorithm (AD) produced on transmission in operation f) for again finding the particular recipient's own personalized control word (MCPi);

p) the particular recipient (Di) then descrambles the scrambled personalized program elements (EPPEi) intended for the particular recipient and obtained after operation m) on the basis of the personalized control word (MCPi) obtained after operation o) and obtains in uncoded form the personalized program elements (EPPEi).

11. Process according to claim 10, wherein to obtain, in operation o), from the cryptogram of the root control word (CMCR), the service key (CS) and the identifier (IDi), the personalized control word individual to the particular recipient (MCPi), the particular recipient (Di) starts by applying to the cryptogram the root control word (CMCR), the decrypting algorithm ($AC^{-1}$) which is the reverse of the encrypting algorithm (AC) using the service key (CS) as the parameter, which gives the particular recipient the root control word (MCR) and the particular recipient then applies to the latter the diversification algorithm (AD) using the single address (UA) as the diversification parameter, which finally gives the particular recipient the particular recipient's individual personalized control word (MCPi).

12. Process according to claim 10, wherein to obtain, in operation o), from the root control word cryptogram (CMCR), the service key (CS) and the identifier (IDi), the personalized control word individual to the particular recipient (MCPi), the particular recipient (Di) applies the diversification algorithm (AD) to the service key (CS) with the address (UA) as the diversification parameter, which gives the particular recipient the personalized service key (CSP) and the particular recipient then applies the decrypting algorithm ($AC^{-1}$) to the root control word cryptogram (CMCR) taking the personalized service key (CSP) as the decrypting parameter, which gives the particular recipient the personalized control word (MCPi) individual to the particular recipient.

* * * * *